US010567774B1

(12) United States Patent
Potter (10) Patent No.: US 10,567,774 B1
(45) Date of Patent: *Feb. 18, 2020

(54) METHOD AND APPARATUS OF CREATING MEDIA CONTENT

(71) Applicant: OPEN INVENTION NETWORK LLC, Durham, NC (US)

(72) Inventor: Harper Kent Potter, Allen, TX (US)

(73) Assignee: OPEN INVENTION NETWORK LLC, Durham, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/386,144

(22) Filed: Apr. 16, 2019

Related U.S. Application Data (63) Continuation of application No. 15/943,035, filed on Apr. 2, 2018, now Pat. No. 10,264,270, which is a continuation of application No. 12/500,642, filed on Jul. 10, 2009, now Pat. No. 9,936,205.

(51) Int. Cl.
*H04N 9/04* (2006.01)
*H04N 19/162* (2014.01)
*H04N 19/12* (2014.01)

(52) U.S. Cl.
CPC .......... *H04N 19/162* (2014.11); *H04N 19/12* (2014.11)

(58) Field of Classification Search
None
See application file for complete search history.

(56) References Cited

U.S. PATENT DOCUMENTS

| 7,035,907 | B1 | 4/2006 | Decasper et al. | |
|---|---|---|---|---|
| 2003/0158913 | A1* | 8/2003 | Agnoli | H04L 29/06 709/219 |
| 2005/0246757 | A1 | 11/2005 | Relan et al. | |
| 2006/0190105 | A1 | 8/2006 | Hsu et al. | |
| 2009/0094525 | A1* | 4/2009 | Coelius | G06Q 10/00 715/741 |
| 2010/0257236 | A1 | 10/2010 | Agnoli et al. | |
| 2011/0265136 | A1* | 10/2011 | Liwerant | H04M 3/567 725/112 |
| 2011/0307548 | A1* | 12/2011 | Fisk | H04L 29/06 709/203 |
| 2013/0156404 | A1 | 6/2013 | Lahr et al. | |

* cited by examiner

*Primary Examiner* — Heather R Jones (57) ABSTRACT

A method and apparatus of processing content, such as, video and/or audio are disclosed. The operations of processing content may include receiving user input, such as, a content file, a type of content format, and a content destination. Other operations include determining necessary operations needed to complete the content processing and determining the applications available to the user on a local machine used by the user. The operations further include determining whether the user's local machine includes the necessary applications to perform the content processing, and determining a codec that will be used to process the content, and formatting the content using the codec and distributing the content to the content destination.

20 Claims, 5 Drawing Sheets

METHOD AND APPARATUS OF CREATING MEDIA CONTENT

TECHNICAL FIELD OF THE INVENTION

This invention relates to an optimized process of creation and distribution of media content. Some examples may include a method, apparatus and/or computer program configured to receive and process media content. Additional features may include a user-friendly application that receives the media content and publishes the media content.

BACKGROUND OF THE INVENTION

Creating digital video and/or media content for distribution, broadcast, or, streaming over the Internet, is a competitive business. Although hardware and software applications have become more accessible to video publishers, a user must have at least some advanced knowledge of video codecs, format requirements, content players, file types, software functionality, etc., in order to create and distribute the published video across varying platforms.

In order for a publisher of content to distribute the content to third parties, several intermediate operations are required. In one example, a minimum of twelve operations may be required to create and distribute video content. In operation 1, a user connects a video camera to a computer. In operation 2, the user opens a first software application (i.e., editing software). At operation 3, the user must select an import type and settings for the video to transfer onto the computer for editing. In operation 4, the user edits the video via an editing software application. In operation 5, the user sets a file output for export that coincides with formats accepted by their respective compression and transcoding software application. In operation 6, the user opens a second software application (i.e., compression and transcoding software). In operation 7, the user determines an output format and sets the destination settings. In operation 8, the user identifies an output file on the computer and renames the files for purposes of identification and distribution. In operation 9, the user opens a third software application (i.e., a FTP client) that will allow the video to be uploaded to web servers. At operation 10, the user must open every web server bin individually where they wish to store the final video output file. At operation 11, the user manually transfers the final video output file to a selected web server bin(s). Finally, at operation 12, the user must open every video file in every video bin that will serve the video and must configure the respective user settings (i.e., permissions).

Many of the software tools that are used in the video editing and distribution process are proprietary to either Microsoft Windows©, Apple, or various open source initiatives (OSIs). Microsoft created a software application called Windows workflow foundation (WF) and Apple created a similar application called Automator. Both software tools provide assistance for a user to create workflow solutions that remedy tasks. However, each tool requires a significant amount of training before being effectively implemented by an experienced user. Neither tool is capable of managing the complexities associated with interfacing with multiple software programs specifically designed for video creation and distribution.

Advanced content programmers using both "Automator" by Apple or "Windows workflow foundation" from Microsoft are unable to achieve an automated process for compression through distribution. Neither of these programming tools store passwords for accessing remote server storage bins which may be necessary for distribution of video across multiple websites. Modules within open source applications, which may, for example, utilize Drupal, Ruby, Linux, or similar software applications, help streamline distribution to multiple sites, but, these applications do not integrate with editing software to remove the manual tasks associated with completing a video file for distribution across websites. In addition, these existing technologies require a user to have expertise in all intermediate operations necessary to create video for distribution.

Other software applications may shorten the video creation workflow with the addition of multiple format output files. However, none of the software packages manage the compression, publishing, distributing and/or version settings encountered during a content publication and distribution procedure. Every existing product available on the market requires manual intervention to proceed in the workflow procedures. For example, AVS Video Converter 6.2, TMPGEnc 4.0 XPress and ROXIO Crunch (all Windows based applications) only create video files and have nothing to do with compressing, transcoding, publishing, and distributing video content over the Internet.

Video publishers and distributors often experience incompatibility with their application platforms. For example, neither WF nor Automator were designed with the capability to recognize the completion of tasks in one software application and trigger the next stage of activity within a new software program. In addition, common software application packages available today only provide the most basic video editing tools for the end user. For example, Table 1 illustrates example editing programs.

TABLE 1

| Video Editing Software Packages | QuickTime | Windows Media |
|---|---|---|
| Adobe Premiere Pro | Yes | Yes |
| Adobe Premiere Elements | Yes | Yes |
| Avid Xpress DV | Yes | Yes |
| Avid Xpress Pro | Yes | Yes |
| Blender | Yes | No |
| Cinelerra | Yes | Yes |
| EDIUS Pro/Broadcast | Yes | Yes |
| Final Cut Express | Yes | Yes (3rd party) |
| Final Cut Studio | Yes | Yes (3rd party) |
| FORscene | Yes (MPEG 2) | Yes (MPEG 2) |
| iMovie HD | Yes | Yes (3rd party) |
| Kdenlive | Yes | Yes |
| Kino GTK | No | No |
| LiVES | Yes | Yes |
| Serif MoviePlus | Yes | Yes |
| Sony Vegas | Yes | Yes |
| Pinnacle Studio | Yes | Yes |
| Ulead MediaStudio Pro | Yes | Yes |
| Ulead VideoStudio Plus | Yes | Yes |
| Merging Technologies VCube | Yes | Yes |
| Video Edit Magic | Yes | Yes |
| Windows Movie Maker | No | Yes |

Each of the above-noted example editing applications are limited to video editing only and do not provide any flexibility or options regarding compression, transcoding or distribution of video and other related information to the final destination (i.e., website, etc.).

SUMMARY OF THE INVENTION

One embodiment of the present invention may include a method of processing content. The method may include receiving user input including at least one content file, at least one type of content format, and at least one content destination. The method may also include determining necessary operations needed to complete the content processing and determining the applications available to the user on a local machine used by the user. The method may further include determining whether the user's local machine comprises the necessary applications to perform the content processing, determining a codec that will be used to process the content, and formatting the content using the codec and distributing the content to the content destination.

Another example embodiment of the present invention may include an apparatus configured to process content. The apparatus may include a memory configured to store user input received that includes at least one content file, at least one type of content format, and at least one content destination. The apparatus may also include a processor configured to determine necessary operations needed to complete the content processing, determine the applications available to the user, and configured to determine whether the user's applications are configured to perform the content processing. Other operations performed by the processor may include determining a codec that will be used to process the content, and formatting the content using the codec and distributing the content to the content destination.

DETAILED DESCRIPTION OF THE INVENTION

It will be readily understood that the components of the present invention, as generally described and illustrated in the figures herein, may be arranged and designed in a wide variety of different configurations. Thus, the following detailed description of the embodiments of a method, apparatus, and system, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, the usage of the phrases "example embodiments," "some embodiments," or other similar language, throughout this specification refers to the fact that a particular feature, structure, or characteristic described in connection with the embodiment may be included in at least one embodiment of the present invention. Thus, appearances of the phrases "example embodiments," "in some embodiments," "in other embodiments," or other similar language, throughout this specification do not necessarily all refer to the same group of embodiments, and the described features, structures, or characteristics may be combined in any suitable manner in one or more embodiments.

Offering video distribution application tools with a format that can incorporate Windows, Apple, and Open Source applications (i.e., which may utilize Linux, Ruby, Drupal, etc.) may provide increased flexibility and cross-platform compatibility required to alleviate the content production and distribution process.

Coordinating inter-process communication between software applications and related hardware device processing modules may remove the burden of multiple task operation handling from the user so that they no longer have to provide input and time needed to handle the intermediate operations. Certain input from the user may be inevitable to starting the content distribution and publishing processes. For example, according to one example embodiment, it may be required for the user to provide input regarding a certain protocol or format standard prior to performing the remaining software applications needed to complete a content distribution and publication cycle.

One example embodiment may include first receiving input from the user and then determining all of the required subsequent intermediate operations to create a desired output. The determining operation may include an evaluation of all of the available resources and software on a user's side of the network prior to or during the creation process of creating the desired output. For example, a user may input their desired output format, and next, the user's available network software may be identified automatically by the application disclosed according to an example embodiment. The application may identify the necessary codecs, file formats, and distribution requirements to achieve the desired result without further user input or user selection operations.

According to one example embodiment of the present invention, a user must only specify a limited number of input parameters prior to starting a content processing application that prepares the content for final delivery and publication.

Figure 1:
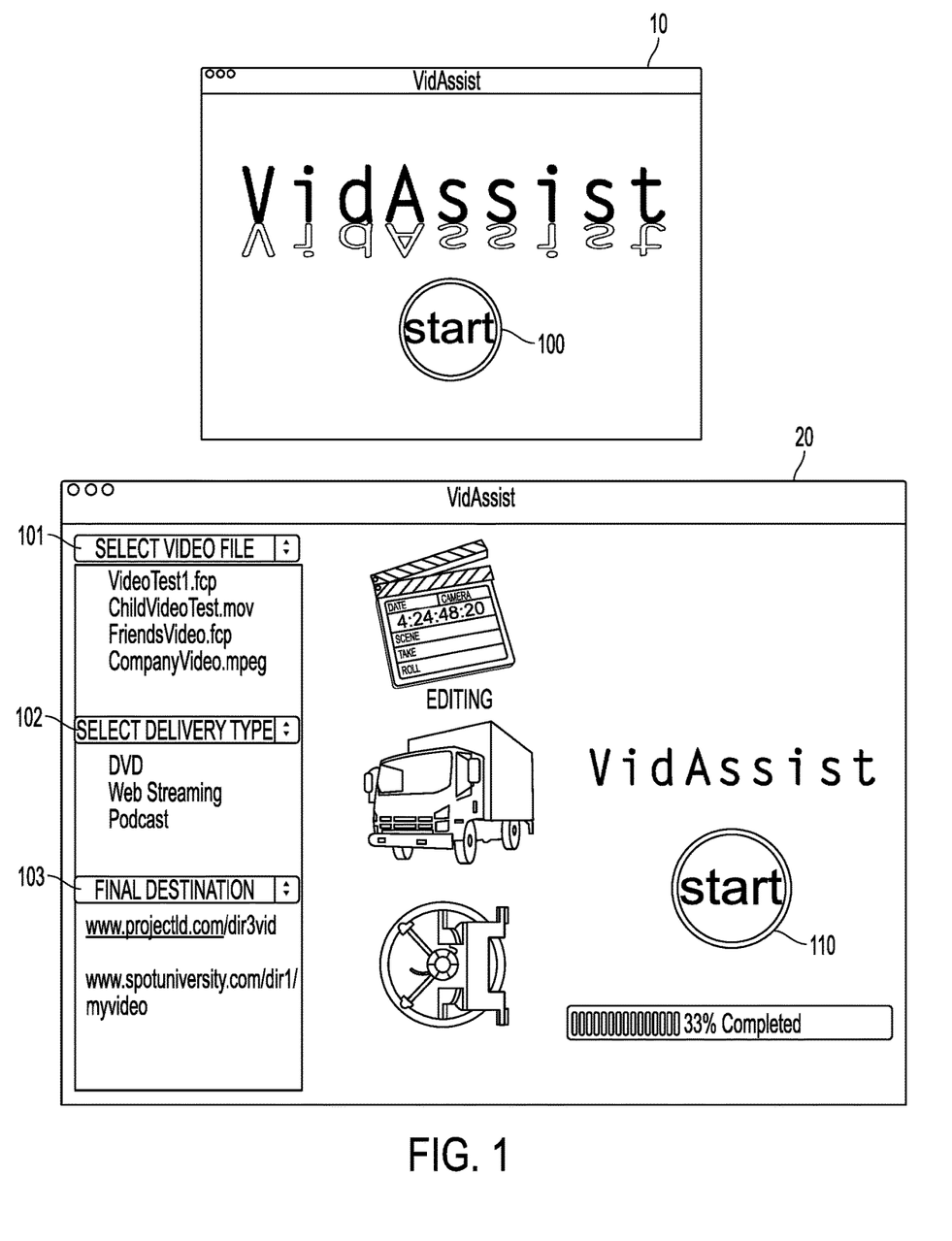
FIG. 1 illustrates an example graphical user interface according to an example embodiment of the present invention.

FIG. 1 illustrates an example embodiment of the present invention. Referring to FIG. 1, a first screen shot 10 illustrates a start operation 100 that the user may click on to begin the application (i.e., "Vidassist"). The next screen shot 20 provides a recording file type operation 101, a desired output location operation 102 and a preferred video player operation 103, which may be buttons that can be selected by the user.

In operation, the user may select a particular file or piece of content by clicking on operation 101 (i.e., "CompanyVideo.mpg") that she wishes to have processed and published via the application. Next, the user may select operation 102 to determine a final output result, such as, creation of a DVD, web streaming content, podcast content, etc. depending on the desired result of the video content. Lastly, the user may select a final destination at operation 103, such as, a website address for publication.

Once a user has performed the three selections, the application will determine and execute the necessary intermediate operations required to produce a final output format and deliver the final product based on the user's specifications.

One particular operation that may be handled by the application itself is the selection and execution of a particular codec used for the distribution of the content. The application may use any of a large number of different codec standards. For example, the application may implement any of at least: H.261, MPEG-1 Part 2, MPEG-2 Part 2, H.263, Sorenson Spark, MPEG-4 Part 2, DivX, Xvid, FFmpeg MPEG-4, 3ivx, x264, Sorenson 3, Theora, WMV (Windows Media Video), VC-1, RealVideo, Cinepak, Huffuv, Lagarith, etc.

As noted above, once the application has been accessed by the user and input has been provided to include a file type, delivery type and final destination, the application may then collect information on available resources and determine intermediate operations and software packages that are required. Additional options may then be displayer to the user (not shown). At this point, the user may override these additional selection operations and initiate processing. The application may provide a progress bar to inform the user of the overall progress made regarding the processing operations included to reach a final publication of the content.

In another example of the user input operations, the user may begin the selection operations by selecting operation 101 and selecting a Quicktime movie export from an editing package such as Apple's Final Cut Pro©. In operation 102, the user may select what type of final video player will be used, such as, a Drupal video module for web streaming or a DVD player, etc. The present application may also provide the ability to send the content to multiple destinations each in a different format, and, thus, multiple selections may be made. These additional features may be selected when each destination selected has different format requirements and login parameters.

Next at operation 103, the user may specify the final destination(s) for the output file, such as a path on Amazon S3 or on a local computer or network directory. In an advanced operation (not shown), the user may specify username and password information associated with accessing a final destination (i.e., website security or network security), if needed.

By performing multiple different content processing, rendering and/or encoding operations automatically without the user's input, the user is not required to have knowledge of the requirements of each different output player application and/or to perform individual processing operations for each piece of video content included in a pipeline.

For web destinations, the video content would need to be sent to the proper site with the proper file transfer protocol (i.e., FTP) and with the proper login credentials. For a DVD destination selection made by the user (operation 102 of FIG. 1), the transcoding requirements may be completely different than if the video content were to be instead published to a web destination. For example, the video resolution requirement would be significantly higher to create a DVD, and a different set of applications would be required in the chain of processing operations performed by the application. For instance, a DVD would require a DVD burning application as opposed to a data transfer application.

Adding a second destination beyond the originally selected destination of operation 103, would increase the complexity of the content processing procedures of the application. For example, this additional destination might require the same video content to be processed (i.e, codec required, compression format, file size, file type, etc.) and uploaded in a completely different manner than in the first operation. Not only would a manual user initiated process require more time, such a manual operation would add the additional potential for the files to be mixed up in the process (i.e., human error).

As an example of the requirements of certain content output destinations, video services on YouTube, Yahoo, Google, and Microsoft's MSN all do not accept files in the Flash (.FLV) format. However, this format is very commonly used in association with other streaming video sites which incorporate the use of such video players as those provided by the Drupal content management system. For example, Microsoft only accepts videos to be uploaded in the "AVI", "WMV", "MPEG", "QT" formats, and, via a few other less common formats. Additionally, YouTube requires a frame rate of at least 24 fps (frames per second) while Google's minimum is 12 fps. In addition, Yahoo limits file sizes to be under 150 MB and Microsoft only allows video file sizes up to 100 MB. On the other hand, Google allows files approximately ten times that size.

In further detail, the user initiated application may begin by having the user perform a clicking operation. At this point, the application will query the available software resources (i.e. installed software applications) on the user's local machine and/or on any remotely-mounted directories to determine what applications are available for the content transcoding and distribution operations. The querying may be performed by a query module 201 of an application system 200 of FIG. 2 according to example embodiments of the present invention.

Figure 2:
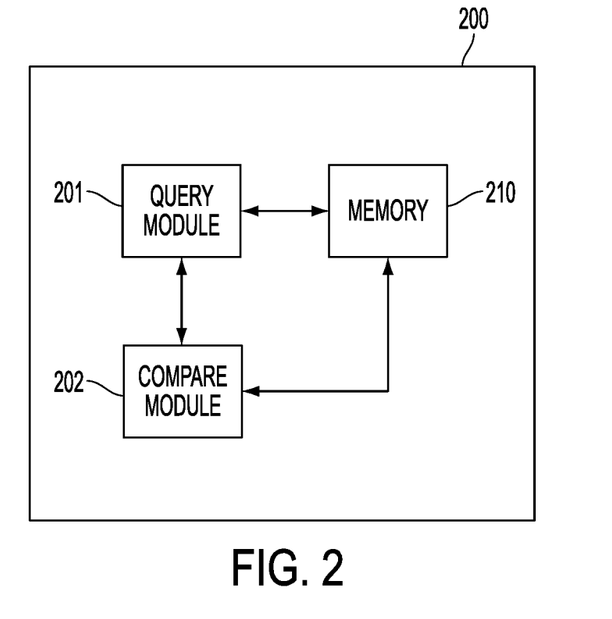
FIG. 2 illustrates a computer device according to an example embodiment of the present invention.

Next, the application will compare this list of software to its internal library of information that describes the capabilities of common software tools via compare module 202. The internal library may be stored locally in memory 210 or may be accessed form a remote database. The application may than combine this list of software from the local machine with the library of software capabilities to create a virtual description of the capabilities of the user's computer, multi-media devices, phone, or other applications or devices currently available to the user. The application may then consult its library again to determine the requirements of different video players to determine the exact file type and codec necessary to meet the user's output needs.

The query module 201 and the compare module 202 may be processors, or, may instead be combined into a single processor. The memory 210 may be separate from the processor, or, instead may be embedded inside the processor(s) itself. The memory may represent a computer readable medium that is accessible via one or more processors to provide software code that may be executed by the processor(s) of one or more of the modules.

The internal library will determine these operations in response to the user's selected input video format, the software capabilities of the user's computer, and the required output format. A query is then sent to verify that the user's local machine is capable of performing the required tasks to determine if the required output can be properly created and delivered. If so, the application will create an ordered listing chain of existing software applications that may be used to take the input video and deliver it to its final destination in the proper format. If not, an error message will be displayed to the user that the required output cannot be delivered based on the current requirements and system capabilities of the user's local machine. The user may then be shown a description of the reason for the failure, as well as a few options to proceed.

One option will be for the user to purchase the missing software application from a list of suggested applications that the application provides. This list will be created based on the specific needs of the project determined form the query module 201 and the compare module 202, as well as from the results of the internal library of software capabilities stored in memory 210. For example, if there is no installed application on the user's local machine that can perform the required operation of converting a Quicktime "MOV" file to a Flash "FLV" file, the application might suggest an application that is capable of such a conversion, such as, Sorenson Squeeze. The application may then provide a way to directly purchase the application, or, it may simply refer the user to the software maker's website. These options may be based on the relationship between the owners of the present application tool and the owners of the software needed.

Another option according to another example embodiment of the present invention will be to provide the user with the ability to upload the content to an external remote organization that is capable of providing the necessary processing and returning the finished product. Continuing with the above example, a third party organization may have the ability to receive a MOV file and convert it to a FLV file before sending it back to the user's computer. In this example, once the incompatibility of the user's local machine has been determined, the application may contact the third party's website or remote access application in order to enable the user to receive the proper file conversion.

Another option according to another example embodiment of the present invention will be for the user to either add an additional software tool to the list of existing tools already included in the application's list, or, to update the capabilities of the existing application. For example, in case the application missed an installed application during its initial system query, or, if the application was previously unaware of some of the functionality of an existing software tool. Once the modifications or adjustments have been completed, the application will repeat its application chain creation process and resume the overall processing and distribution procedures that were originally initiated. Certainly, another option would be to abort the current project execution if the application could not meet the expectations of the user's project.

Once the application chain is created and all necessary software tools and processing modules have been established, the application will launch the initial application specified in the chain. This operation will specify all of the required parameters, including input location(s) and output location(s), formats, etc. As noted previously, within a single project, several input locations (i.e., file locations) and output locations (i.e., websites) may be specified. This provides the user with the capability to process multiple files and to deliver them to multiple destinations, all with a single application execution.

In one example embodiment, the application will wait until the processing of single sub-application in the chain is completed, then repeat the process with the next sub-application in the chain by taking the output from the previous sub-application and feeding it into the input of the upcoming sub-application. For projects with multiple input files, these sub-application stages can be performed in parallel so that each of the input files are processed at the same time. For example, when file one passes into the next sub-application in the chain, then file two can start the first sub-application. In this example, multiple applications can be executing simultaneously, with the multiple input files in various stages of processing as they pass through the applications in the chain. Some of the applications within the chain might have the ability to perform operations on multiple files simultaneously.

For example, a transmit application may take a single file or multiple files and transmit them to multiple output destinations simultaneously. This process will be repeated until the video is properly delivered. For example, assuming the user wants to use a Drupal video module for web streaming and his website content is hosted by Amazon S3. She would need her final video to be in a remote directory on S3 called "/abc.xyz.com/vids/myvideo."

After exporting the completed video from her editing package sub-application to a Quicktime video, she will start the application. In this configuration, she will browse for the exported video and specify its Quicktime format. Next, she will inform the application that she wants the videos delivered to the /abc.xyz.com/vids/myvideo directory in Amazon S3. She will then input her credentials (e.g. name and password) for the output server.

After the user selects "start" to initiate the process, the application will query the user's computer to determine the available software (see query module 201). After consulting its internal library of information, it may also determine that the best format to use when streaming video using Drupal's video module is a particular Flash video format. Now the application knows that it needs to take a Quicktime video from the input directory, transcode it to a Flash file, and upload it to the Amazon S3 directory. The application will use these requirements when attempting to access the available software on the client's computer hardware.

In this example, assume that the application discovered an installed copy of Sorenson Squeeze on the user's computer. Based on its internal library of information, the application knows that this application is capable of converting the Quicktime file directly into the required Flash format. The application also finds a copy of the transmit application, which is an application capable of distributing the Flash file using the protocol required by Amazon. With this information, the application is capable of creating a chain of sub-applications consisting of the Sorenson Squeeze sub-application and the transmit sub-application.

The application will next launch Squeeze, specify the parameters of the video content, and initiate the transcoding process. The application will then wait for Squeeze to finish, then close Squeeze and automatically launch the transmit application, which is the next sub-application in the application chain. The application will also set the parameters for this package. For instance, by specifying the output from Squeeze as the input to this process. The application will also use whatever login parameters that the user initially specified. The application will then wait for the transmit sub-application to complete, then it will close the application and provide the results to the user.

Figure 3:
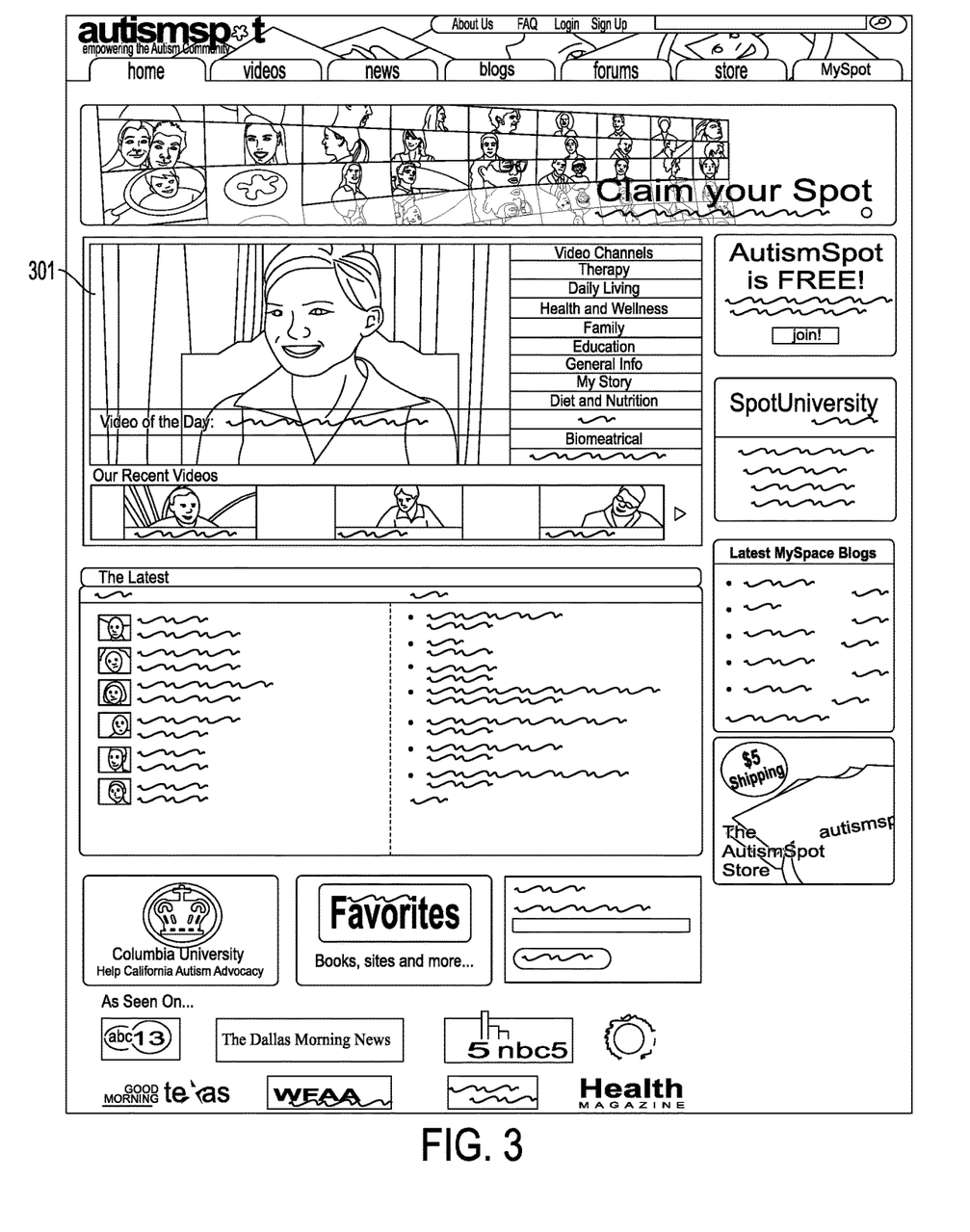
FIG. 3 illustrates an example screen shot and menu interface according to an example embodiment of the present invention.
Figure 4:
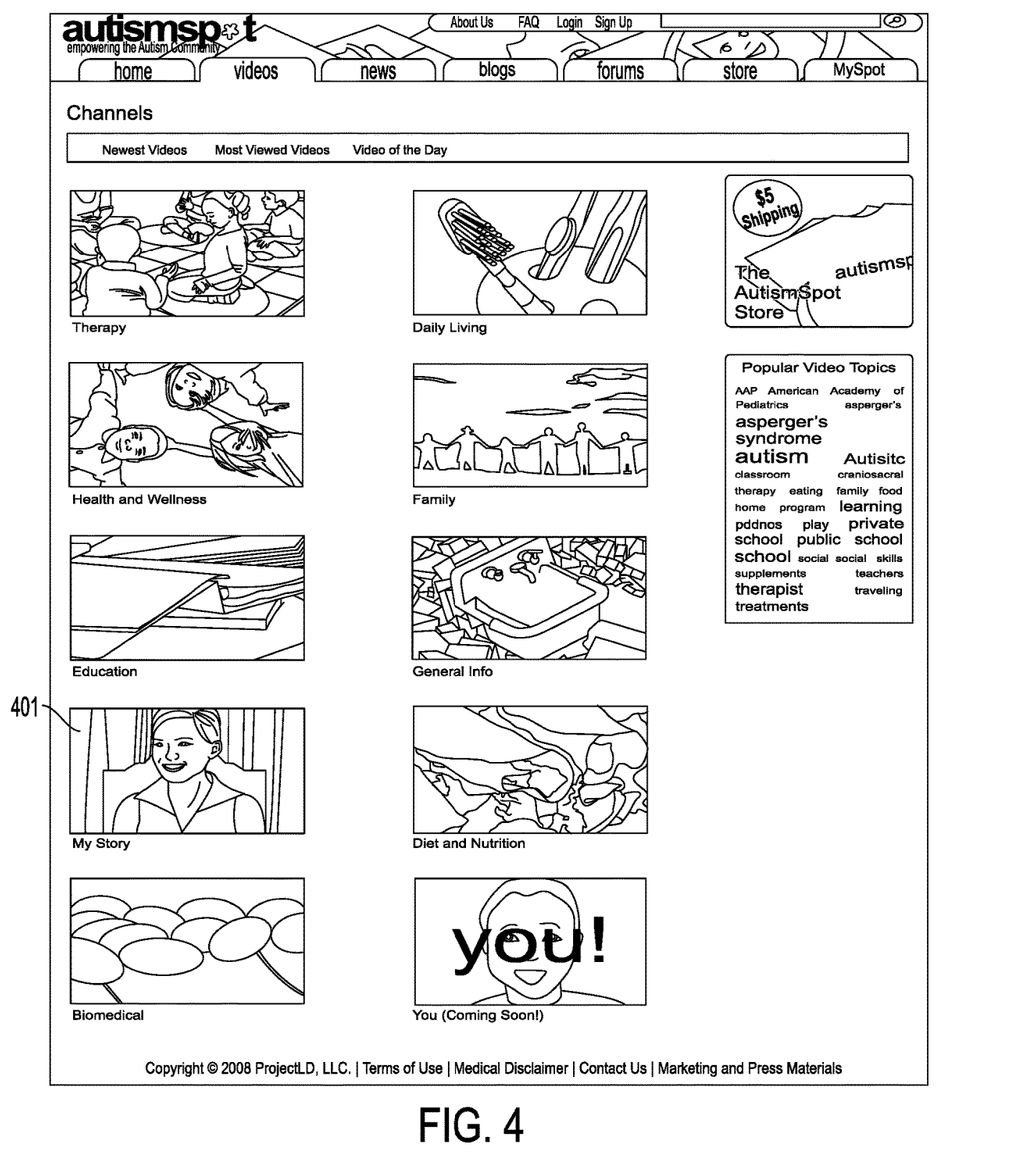
FIG. 4 illustrates another example screen shot and menu interface according to an example embodiment of the present invention.

The example screenshots illustrated in FIGS. 3 and 4 are examples of the final output of distributed video across multiple sites utilizing the application. As noted above, the application is configured to determine the required intermediate operations to perform a content editing and distribution procedure. The application is also configured to determine available resources and software on a user's local machine or network when creating the desired output. The application may accommodate one single individual or may be configured to assist a 100,000 person facility with the distribution of video and image content.

Referring to FIG. 3, the video content 301 of a woman's interview is distributed to a website. The present application may provide the ability to insert the content into a website's predefined content publication window according to a particular size and web location uniform resource locator (i.e., URL). In FIG. 4, the same content 401 has been published as a sample of the content illustrated in FIG. 3 (i.e., a thumbnail), which may be clicked on by a user to initiate the video content.

The application is designed to work with both Microsoft Windows and Apple OS X and above platforms. The application acts as an intelligent interface initiating and coordinating execution of video conversion and distribution. In addition to video content, the application could also be used to publish and distribute images in this same process.

Figure 5:
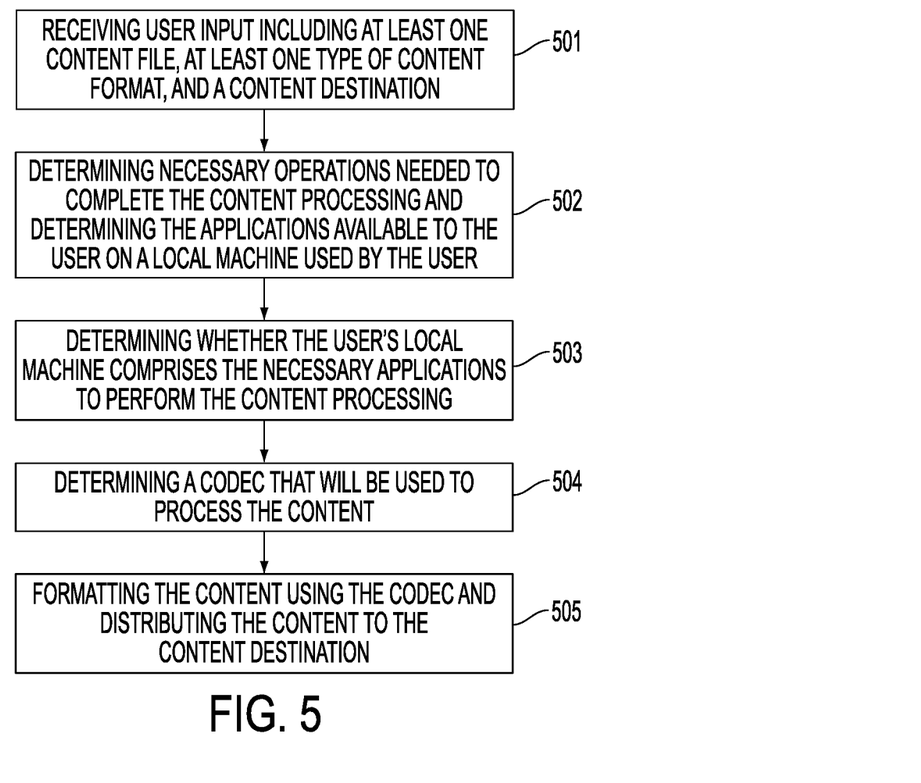
FIG. 5 illustrates a method according to an example embodiment of the present invention.

One example method according to example embodiments of the present invention may include receiving user input including at least one content file, at least one type of content format, and at least one content destination, operation 501 of FIG. 5. The method may further include determining necessary operations needed to complete the content processing and determining the applications available to the user on a local machine used by the user, operation 502. The method may also include determining whether the user's local machine includes the necessary applications to perform the content processing, operation 503. The method may further include determining a codec that will be used to process the content, operation 504. The method may also include formatting the content using the codec and distributing the content to the content destination, operation 505.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art. An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components.

While preferred embodiments of the present invention have been described, it is to be understood that the embodiments described are illustrative only and the scope of the invention is to be defined solely by the appended claims when considered with a full range of equivalents and modifications (e.g., protocols, hardware devices, software platforms etc.) thereto.

What is claimed is:

1. A method, comprising:
    determining, via a processor, applications available to a local machine based on at least one content file, at least one type of content format, and at least one content destination;
    determining, via the processor, a codec that will be used to process content, wherein the determining of the codec comprises:
        comparing a list of software with an internal library of information describing capabilities of common software tools,
        combining the list of software with the library to create a virtual description of computing device's capabilities, and
        reviewing the library to determine requirements of different video players to detect the file type and the codec necessary to meet output requirements of the computing device;
    distributing the content to the content destination; and
    inserting the content into a website's content publication window according to a particular size and a web location uniform resource locator.

2. The method of claim 1, comprising determining whether the user's local machine comprises the applications to perform the content processing, wherein the determining the applications available to the user includes determining that a needed application is not available on said user's local machine and offering the user the option to install the needed application.

3. The method of claim 1, comprising formatting, by the processor, the content using said codec.

4. The method of claim 1, wherein the determining the codec used to process said content comprises performing a codec selection based on the at least one of the user's selected at least one content file, the at least one type of content format, and the content destination.

5. The method of claim 1, wherein the codec selected is at least one of H.261, MPEG-1 Part 2, MPEG-2 Part 2, H.263, Sorenson Spark, MPEG-4 Part 2, DivX, Xvid, FFmpeg MPEG-4, 3ivx, x264, Sorenson 3, Theora, WMV (Windows Media Video), VC-1, RealVideo, Cinepak, Huffuv and Lagarith.

6. The method of claim 1, wherein if the user selects the at least one type of content format to be a DVD, then the codec selected will have a higher resolution than a resolution of a web publishing content format.

7. The method of claim 1, wherein the distributing the content to the content destination further comprises distributing the content to multiple different destinations.

8. The method of claim 1, wherein the distributing the content to the multiple different destinations comprises formatting the content in a different format for each of the different destinations.

9. The method of claim 8, wherein the formatting the content in a different format for each of the different destinations comprises determining resolution requirements of the destination and processing the formatting based on said requirements.

10. An apparatus, comprising:
    a processor configured to:
    determine applications available to a local machine based on at least one content file, at least one type of content format, and at least one content destination;
    determine a codec that will be used to process content, wherein the determining of the codec comprises:
        compare a list of software with an internal library of information describing capabilities of common software tools,
        combine the list of software with the library to create a virtual description of computing device's capabilities, and
        review the library to determine requirements of different video players to detect the file type and the codec necessary to meet output requirements of the computing device;
    distribute the content to the content destination; and
    insert the content into a website's content publication window according to a particular size and a web location uniform resource locator.

11. The apparatus of claim 10, wherein the processor is further configured to:
    determine applications available to the user;
    determine whether the user's applications are configured to perform the content process; and determine that a needed application is not available to said user and to offer the user the option to install the needed application.

12. The apparatus of claim 10, wherein the processor is further configured to format the content using the codec.

13. The apparatus of claim 10, wherein the processor is further configured to determine the codec used to process said content via a codec selection based on the at least one of the user's selected at least one content file, the at least one type of content format, and the content destination.

14. The apparatus of claim 10, wherein the codec selected is at least one of H.261, MPEG-1 Part 2, MPEG-2 Part 2, H.263, Sorenson Spark, MPEG-4 Part 2, DivX, Xvid, FFmpeg MPEG-4, 3ivx, x264, Sorenson 3, Theora, WMV (Windows Media Video), VC-1, RealVideo, Cinepak, Huffuv and Lagarith.

15. The apparatus of claim 10, wherein if the user selects the at least one type of content format to be a DVD, then the codec selected will have a higher resolution than a resolution of a web publishing content format.

16. The apparatus of claim 10, wherein the content distribution comprises a distribution to multiple different destinations.

17. The apparatus of claim 10, wherein content distribution comprises the processor format the content in a different format for each of the different destinations.

18. The apparatus of claim 17, wherein the content being formatted in a different format for each of the different destinations comprises the processor determine resolution requirements of the destination and process the format based on said requirements.

19. A non-transitory computer readable storage medium configured to store code that when executed causes a processor to perform:
  determining, via a processor, applications available to a local machine based on at least one content file, at least one type of content format, and at least one content destination;
  determining, via the processor, a codec that will be used to process content, wherein the determining of the codec comprises:
    comparing a list of software with an internal library of information describing capabilities of common software tools,
    combining the list of software with the library to create a virtual description of computing device's capabilities, and
    reviewing the library to determine requirements of different video players to detect the file type and the codec necessary to meet output requirements of the computing device;
  distributing the content to the content destination; and
  inserting the content into a website's content publication window according to a particular size and a web location uniform resource locator.

20. The non-transitory computer readable storage medium of claim 19, configured to store code that when executed causes the processor to perform:
  determining whether the user's local machine comprises the applications to perform the content processing; and
  formatting the content using said codec and distributing the content to the content destination.

* * * * *